United States Patent [19]

Hashimoto

[11] Patent Number: 4,897,742

[45] Date of Patent: Jan. 30, 1990

[54] SINGLE BUTTON VCR OPERATION SYSTEM

[75] Inventor: Kazuo Hashimoto, Tokyo, Japan

[73] Assignee: Hashimoto Corporation, Tokyo, Japan

[21] Appl. No.: 235,737

[22] Filed: Aug. 22, 1988

[30] Foreign Application Priority Data

Aug. 21, 1987 [JP] Japan .................................. 62-207775

[51] Int. Cl.$^4$ ............................................. G11B 15/20
[52] U.S. Cl. ................................... 360/72.1; 360/74.1; 360/10.3
[58] Field of Search ............ 360/74.1, 72.1, 14.1–14.3, 360/10.3; 358/908

[56] References Cited

U.S. PATENT DOCUMENTS

| | | | |
|---|---|---|---|
| 4,428,001 | 1/1984 | Yamamura et al. ............ | 360/74.1 X |
| 4,443,823 | 4/1984 | Sakamoto ....................... | 360/10.2 X |
| 4,520,406 | 5/1985 | Suzuki et al. ................... | 360/14.2 |
| 4,673,991 | 6/1987 | Namiki et al. .................. | 360/14.1 |

*Primary Examiner*—John H. Wolff
*Attorney, Agent, or Firm*—Lowe, Price, LeBlanc, Becker & Shur

[57] ABSTRACT

A VCR operation system, wherein it is possible to perform a backspace function by operation of a switch button during record or playback. During record or playback of a VCR with a rotary head, if a user wants to play back scenes which he has just watched, he only has to push the switch button, and the tape is rewound for a predetermined period of time, or while the switch button is being pushed. Then the tape is automatically set to a playback mode so that the user can watch the last recorded or played back scenes. In response to another operation of said switching button, the VCR is set to a record or playback mode again. It is also possible to arrange such that the tape position at the time of switching button is memorized and the VCR is set to the record or playback mode again when the tape reaches the memorized position during playback.

5 Claims, 4 Drawing Sheets

SINGLE BUTTON VCR OPERATION SYSTEM

BACKGROUND OF THE INVENTION

The present invention relates to a video cassette tape recording driving system.

According to conventional VCRs, when a user wants to play back again recorded scenes that he has just monitored during recording, he must stop the recording tape once for unloading, rewind the tape to a desired tape position, stop the tape again, and thereafter load the tape to playback. He then has to wait until the tape begins to start. These operations should be repeated for adjusting, and it is not easy to play back the desired recorded scenes in a moment during the recording and thereafter switch to a recording mode again. It causes a time loss and is complex in operation.

SUMMARY OF THE INVENTION

According to the present invention, when a user wants to watch again recorded scenes that he has just watched during recording or to confirm the recording of said scenes, it is possible to automatically rewind the tape for a predetermined period of time by pushing a button momentarily so as to play back said scenes, and to switch to the recording mode by pushing said button once again during said playback.

It is an object of the present invention to enable anybody to perform easly and surely a backspace function, i.e., means for rewinding the tape of a VCR and thereafter playing back recorded scenes automatically and means for returning the VCR to a recording mode, by operating a button during recording.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The detailed description of the preferred embodiments according to the present invention will be now described with reference to the accompanying drawings.

Figure 1:
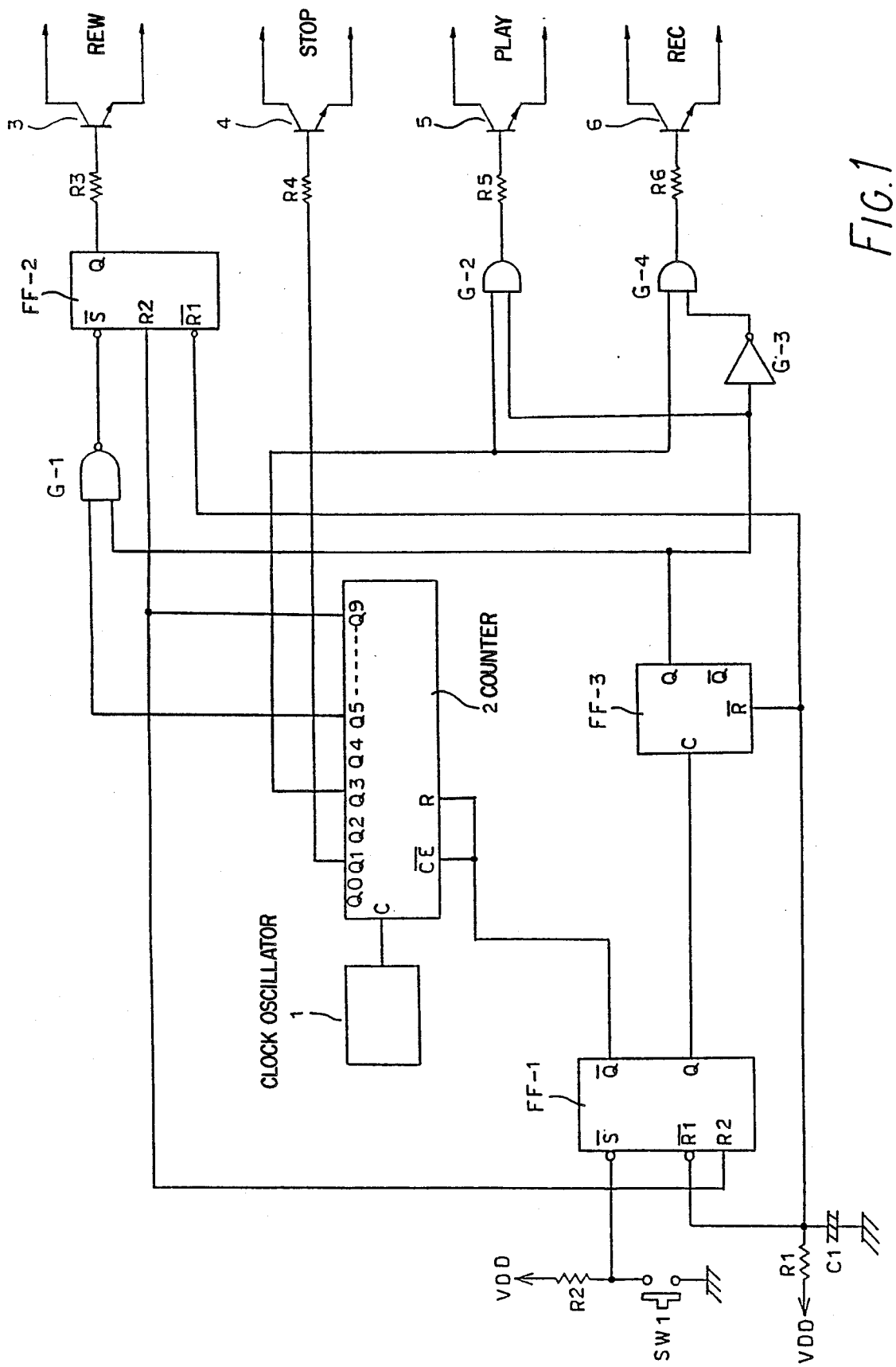
FIG. 1 is a circuit diagram of a first preferred embodiment of the invention.

Referring to FIG. 1, reference numeral 1 denotes a clock oscillator having a cycle of about 0.8 second made of a multivibrator etc. Reference numeral 2 denotes a decimal counter for controlling the operation which will be explained later, and in this preferred embodiment, IC 4017 which is on the market is used, reference symbol C denotes a clock terminal, reference symbol R denotes a reset terminal, and reference symbol CE denotes a clock enable terminal. In the decimal counter 2, an output terminal Q1 is set to H level in response to a number count of 1, and an output terminal Q2 is set to H level in response to a number count of 2.

Reference symbols FF-1 and FF-2 denote an R-S type flip-flop. In this R-S type flip-flop FF-1 and FF-2, reference symbol S denotes a set terminal and reference symbols R1 and R2 denote reset terminals, but the terminal having a bar over the each symbol indicates response to negative logic. Reference symbol FF-3 denotes binary type flip-flop. Reference symbol G1 denotes a NAND gate. Reference symbols G2 and G4 denote AND gates. Reference symbol G3 denotes an invertor. Reference numerals 3–6 denote transistors.

Collectors and emitters of the transistors 3–6 are connected respectively to each terminal of a rewinding key (REW), a stop key (STOP), a playback key (PLAY) and a recording key (REC) of a VCR (not shown in FIG. 1).

In the VCR, when the recording key (REC) is pushed, a specified TV program is recorded by the VCR. When a user wants to see again and to confirm the recorded TV program, a momentary type switch SW1 is set to ON, and as a result, the flip-flop FF-1, the flip-flop FF-2 and the flip-flop FF3 which are reset by a reset circuit comprising a resistance R1 and a capacitor C1 when a power supply is set to ON, are operated as follows.

When the flip-flop FF-1 is set by pushing the switch SW1, output Q from the flip-flop FF-1 is changed from H level to L level. Accordingly, reset of the counter 2 is released, and the counter 2 starts to count clock pulses from the clock oscillator 1. At the same time, the binary type flip-flop FF-3 is changed to a set condition by changing from L level to H level an output Q from the flip-flop FF-1 (this operation will be described later).

Figure 2:
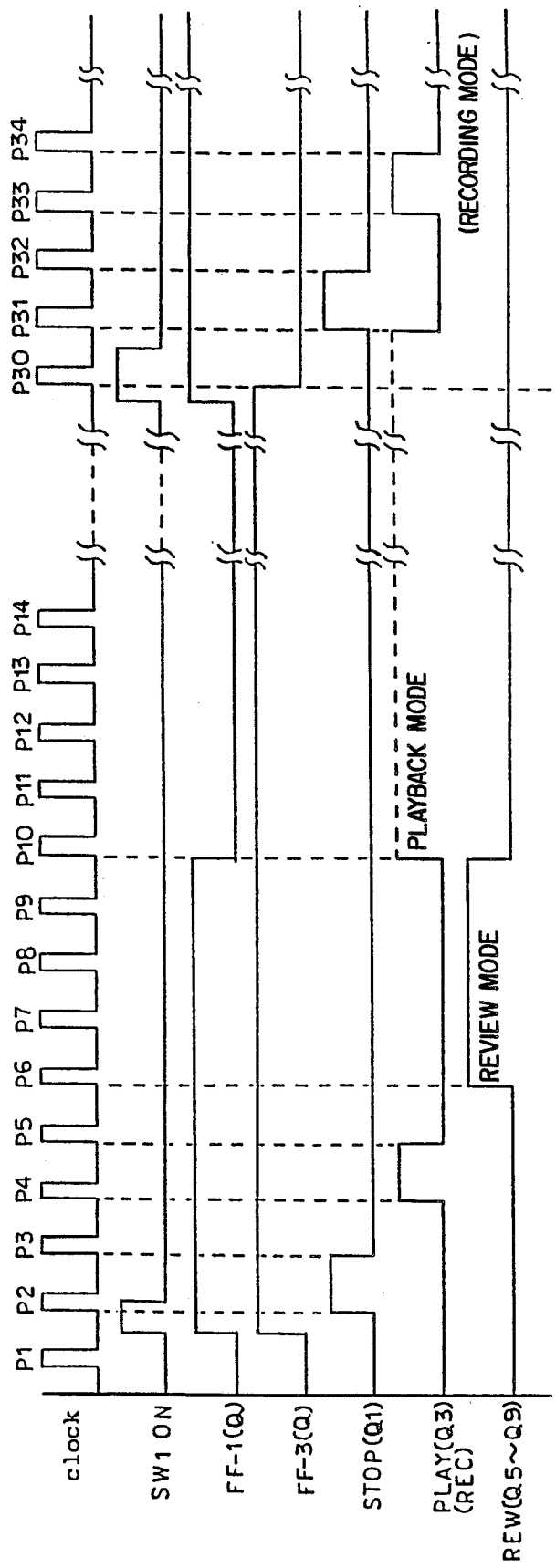
FIG. 2 is a timing chart of the first preferred embodiment shown in FIG. 1.

FIG. 2 shows a timing chart corresponding with the clock pulse. The flip-flop FF-1 is set to ON by turning on the switch SW1, and the counter 2 counts "1" by counting a clock pulse P2 by the counter 2. As a result, an output Q1 from the counter 2 is changed to H level.

In FIG. 1, the output Q1 sets the transistor 4 to ON through the resistance R4. Accordingly, the recording operation is released as the stop key (STOP) of the VCR is pushed.

In FIG. 2, when the counter 2 counts a clock pulse P3, the counting amount becomes "2". The output Q2 (not connected) from the counter 2 is changed to H level, and the output Q1 is returned to L level. As a result, a stopping operaton of the VCR is released. When the counter 2 counts a clock pulse P4, and "3" is counted by the counter 2, the output Q3 from the counter 2 is changed to H level. The output Q3 from the counter 2 sets the transistor 5 to ON through the AND gate kG-2, because the binary type flip-flop FF-3 has already been changed to the set condition, the AND gate G-4 is passive, and the AND gate G-2 is active through the invertor G-3. As a result, the VCR is changed to the play back mode. However, the counter 2 counts a clock pulse P5 and a clock pulse P6 during controlling the mechanism section by the VCR for playing back a part of the recorded TV program, so that "5" is counted by the counter 2. Accordingly, the output Q5 from the counter 2 sets the R-S type flip-flop FF-2 through the NAND gate G-1 (activated by the output from flip-flop FF-3). The transistor 3 is set to ON by the output from the R-S type flip-flop FF-2, and the VCR is set to a rewinding operation.

Because the VCR has already been set previously to a playback mode, the VCR is set to the review mode which rewinds a tape simultaneously with playing back the recorded TV program. The review mode continues during counting of clock pulses P7, P8, P9 and P10 by the counter 2; for example, in this embodiment, it continues for about three seconds.

When the review mode of three seconds passes, the output Q9 from the counter 2 is set to H level, this output resets the flip-flop FF-2, the review operation is released and the VCR is set to the playback mode. At the same time the output Q9 resets the flip-flop Ff-1 and also the counter 2 is reset by the output from the flip-flop FF-1. Accordingly, in this condition, only the flip-flop FF-3 is in the set condition, and the VCR is continuing the playback mode as the operation thereof.

In the playback mode, an operator finishes watching a picture which is played back. The operator pushes the switch SW 1 again in order to start the recording operation again. As a result, as above, the flip-flop FF-1 is set, and the counter 2 is activated to the counting condition. However, in this operation, the binary type flip-flop FF-3 is changed to the reset condition by the output from the flip-flop FF-1. Accordingly, the NAND gate G-1 and the AND gate G-2 become inactive, and the AND gate G-4 becomes active through the invertor G-3 by setting the output from the flip-flop FF-3 to L level.

In the above condition, the counter 2 counts a clock pulse from the clock oscillator 1, and the counter counts "1" by clock pule P31 shown in FIG. 2, then the VCR is stopped, as above, the counter 2 counts "3" by the clock pulse P32, and sets the transistor 6 to ON through the AND gate G-4. As a result, the VCR is set to the recording condition.

In the VCR operation that follows (not shown in the drawings), as above, the NAND gate G-1 becomes passive by counting amount of "5", and accordingly, this operation is ignored. Furthermore, when the count reaches "9", the flip-flop FF-1 and the flip-flop FF-2 are reset, and as a result, the following recording operation that follows continues as an operation of the VCR itself.

The second embodiment will be explained with reference to FIG. 3. In the first embodiment (FIG. 1), when the switch SW1 is pushed, a rewinding of the tape is rewound for about three seconds. Namely, a rewinding time is peset. In the second embodiment, it is possible to rewind the tape continuously during pushing of the switch SW1. Thus, this embodiment can change the rewinding time as occasion demands of a user.

When a user wants to play back the tape in the VCR in the recording condition, the switch SW 1 must be continued to be pushed. The flip-flop FF-1 (a reset terminal R3 is supplemented in the flip-flop FF-1 in FIG. 3 compared with flip-flop FF-1 in FIG. 1) is set, and the reset condition of the counter 2 is released as in the first embodiment. At this time, the terminal 1 of the AND gate G-5 is set to L level by the output of the flip-flop FF-1, the terminal 2 of the AND gate 5 is kept in the L level until the capacitor C3 is charged, and as a result, the output 3 from the AND gate G-5 is set to L level, and the counter 2 counts a clock pulse. When the counter 2 counts "1", the output Q1 is set to H level and the VCR is stopped through the transistor 4. On the other hand, after the VCR is stopped as above, when the capacitor C is charged by continuing to push the switch SW1 through the inverter G-6 and the resistance R8, the tape in the VCR is rewound through the transistor 3. At the same time, an input terminal 2 of the AND gate G-5 is set from L level to H level, and as a result, the counter 2 counts "2", and the output Q2 in the H level stops the operation.

Figure 3:
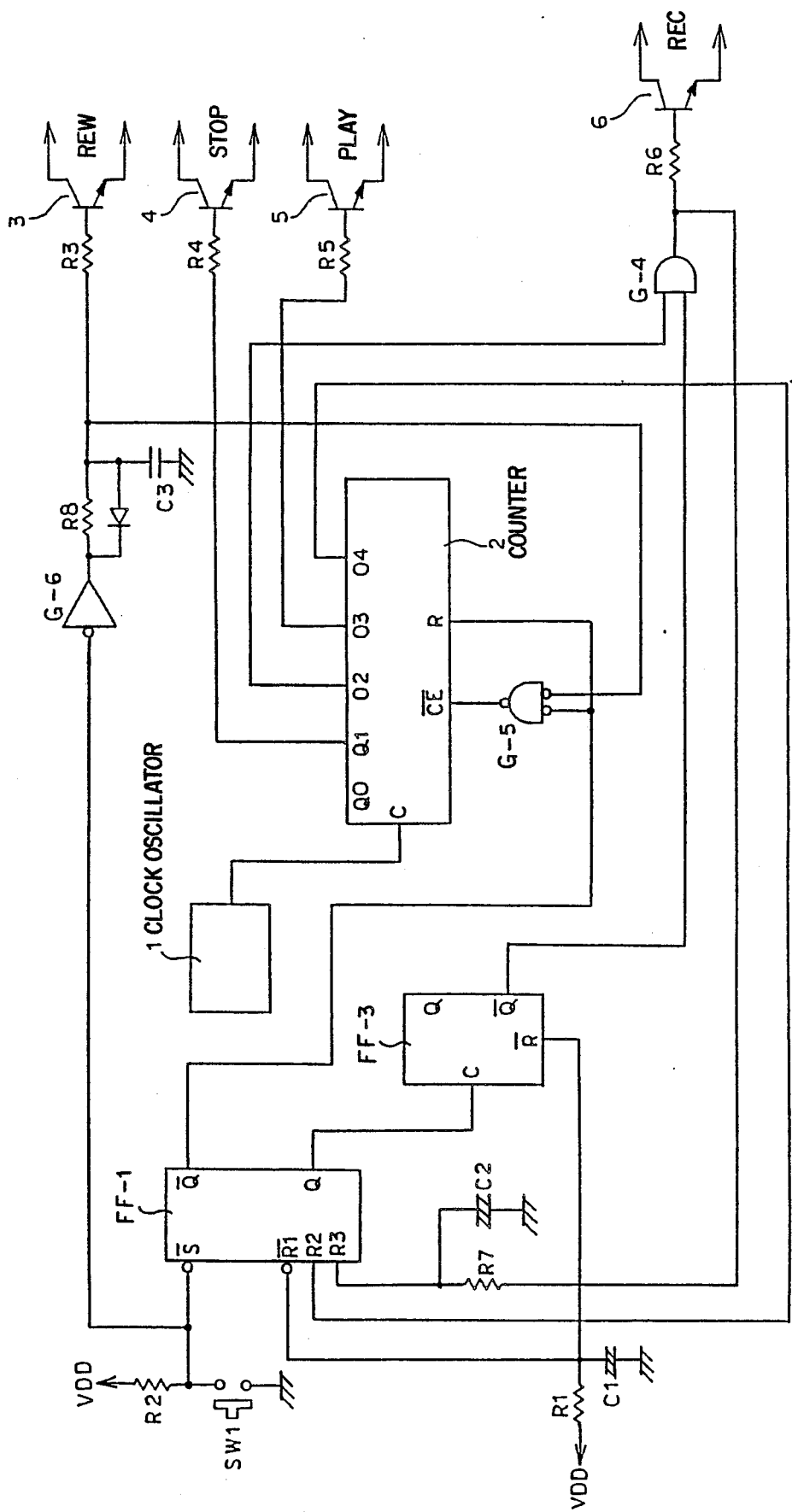
FIG. 3 is a circuit diagram of a second preferred embodiment of the invention.

In FIG. 3, the clock pulse width is set by a time constant of $R8 \times C3$. At this time, even if the output Q2 is at the H level, there is no operation on this stage, because the flip-flop 3 is changed to the set condition and the AND gate is passive. When a specific quantity of the tape is rewound, the switch SW1 is set to OFF, the output from the inverter G-6 is set to L level, and the terminal 2 of the AND gate G-5 returns to L level. When the counter 2 counts "3" by counting the next clock pulse, the output Q3 becomes L level, and the VCR is switched to the playback mode through the transistor 5. Alternatively, it is also possible to carry out a review operation which rewinds the tape after changing to the playback mode as in the first embodiment.

When the next clock pulse is input, and the counter 2 counts "4", and also the output Q4 is changed to the H level, and the flip-flop FF-1 and the counter 2 are reset by te output Q4. On the other hand, the VCR continues playback mode as the operation thereof.

When a user wants to start the recording again, the switch SW1 is pushed again, and as a result, the flip-flop FF-1 is set, and the counter 2 starts to count clock pulse. When the counter 2 counts "1", the counter stops the VCR. When the counter 2 counts "2", the counter 2 switches the VCR to the recording operation through the AND gate G-4, and the flip-flop FF-1 and counter 2 are reset through a time constant of $R7 \times C2$. Thereafter, the VCR continues the recording operation by itself.

Figure 4:
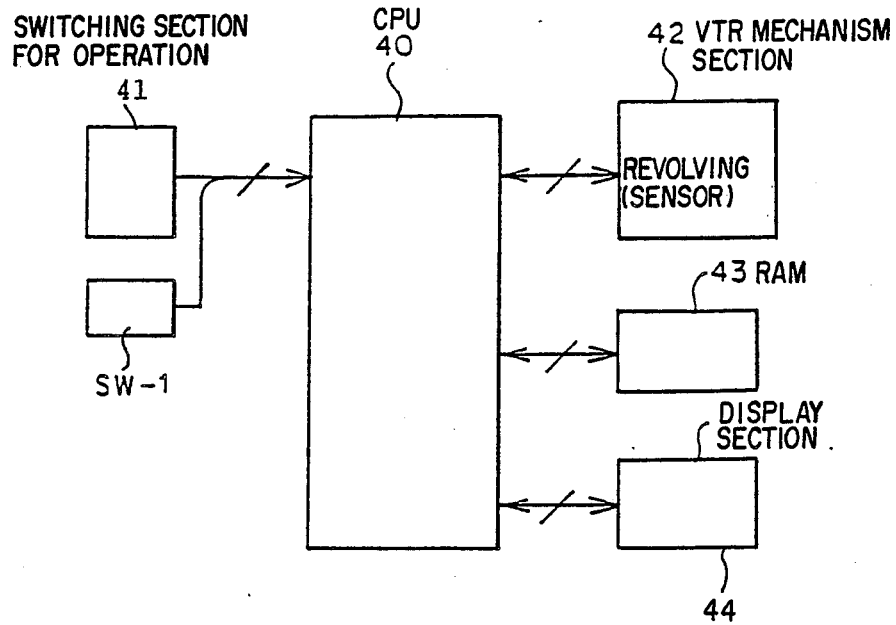
FIG. 4 is a circuit diagram of a third preferred embodiment of the invention.

The third embodiment, operated by a microcomputer, will be described referring to FIG. 4. In FIG. 4, reference symbol SW-1 denotes a one touch type switch. Reference symbol CPU denotes a microprocessor (microcomputer). Reference numeral 41 denotes an operating switch section for rewinding playback, recording, etc. Reference numeral 42 denotes a mechanism section of the VCR. The mechanism section 42 has a rotation sensor for detecting a pulse generated in accordance with rotation of a reel stand in order to read a position of a tape (not shown in FIG. 4) in the VCR. Reference numberal 43 denotes a RAM (random access memory) for memorizing the pulse number to store the tape position.

Referenc numeral 44 denotes a display section which dislays an operation mode of the VCR, a running position (running quantity) of the tape, etc.

First, the VCR has been set previously to the recording mode as above. The pulse generated corresponding with running of the tape in the VCR is detected by the rotation sensor, and the running position (running quantity) of the tape is memorized in a specified address of the RAM as a pulse count. When the switch SW-1 is pushed in order to playback recorded contents, the tape is rewound for three seconds, e.g., by a timer as in the first embodiment. Alternatively, while the switch SW-1 is pushed, the push is detected by CPU 40 and the tape is rewound during pushings as in the second embodiment.

While the tape is rewound, the pulse count is subtracted from the tape position, but when the tape is changed from the rewinding operation to the playback operation, the pulse count is added to the tape position.

When the tape reaches the tape position where the switch SW-1 is pushed, this position is compared with the position memorized in the RAM 43. When this position coincides with the memorized position, the VCR is switched to the recording operation automatically. Alternatively, when the pulse number while the tape is rewound is memorized, and the pulse number coincides with the pulse count after switching to the playback operation, the VCR can also be switched to the recording condition.

In both the above operations, when the tape reaches the tape position where the switch is pushed, the VCR is set to be switched automatically to the recording operation. Accordingly, the operation for switching to the recording operation becomes easy as shown in the first and second embodiments.

As the above explanation, when a user wants to see again or to confirm the recorded part in the recording condition of the VCR using a revolving type head, the tape can be rewound and played back for the fixed time set previously only by operation of pushing the switch. This operation to see the recorded part can be repeated many times. When the switch is pushed again, the recording operation can be continued, namely, this operation can be operated by ON/OFF operation of only one switch. Thus, this invention increases the practical effect of such kinds of device.

Although certain preferred embodiments have been shown and described, it should be understood that any changes and modifications may be made therein without departing from the scope of the invention.

I claim:

1. A VCR operation system and device having means for operating a VCR in various modes and having manual switches such as rewind, stop, play and record switches, wherein a user can play back short durations of scenes recently recorded by the VCR, comprising an additional manual switch, means responsive to a first momentary manual operation of said additional manual switch for rewinding a recording tape from a current position for a predetermined period of time (e.g., about 10 seconds) and then automatically setting the VCR to a playback mode so as to play back recorded scenes, and means responsive to a second momentary manual operation of said additional switch during playback for setting the VCR to a recording mode to continue recording from a position on the tape starting from the second momentary manual operation of said additional manual switch.

2. A VCR operation system having means for operating a VCR in various modes and having manual switches such as rewind, stop, play and record switches for a VCR, including an additional manual switch, means responsive to a continuous operation of said additional manual switch for rewinding a recording tape, and means responsive to a release of said additional manual switch for operating said VCR in a playback mode and means responsive to a second momentary operation of said additional manual switch for operating said VCR in a recording mode from the position of said tape at which said additional manual switch was last operated.

3. A VCR operation system having means for operating a VCR in various modes and having manual switches such as rewind, stop, play and record switches, comprising:
    an additional manual switch arranged to be operated by one touch;
    means for memorizing a tape position during recording by the VCR in response to an operation of said additional manual switch;
    means responsive to the manual operation of said additional manual switch for releasing a recording mode of the VCR after memorizing the position of said tape at the time the additional manual switch was manually operated and then rewinding the tape for a predetermined period of time or while said additional manual switch is being manually operated;
    means for automatically playing back said tape after said rewinding; and
    means for automatically switching the VCR to a recording mode when the tape reaches said memorized tape position during playback.

4. A VCR operation system and device having means for operating a VCR in various modes and having manual switches such as rewind, stop, play and record switches, wherein a user can play back short durations of scenes recorded on a tape and recently viewed by the user, comprising an additional manual switch, means responsive to a first momentary manual operation of said additional manual switch for rewinding the tape for a predetermined period of time (e.g., about 10 seconds) and then automatically setting the VCR to a playback mode thereby to play back recorded scenes, and means responsive to another momentary manual operation of said additional manual switch during playback set said VCR to continue playback thereafter beginning at the position of said tape at which said additional manual switch was previously operated.

5. A VCR operation system for controlling playback of a tape by a VCR, said system having means for operating the VCR in various modes and having manual switches such as rewind, stop, play and record switches, comprising an additional manual switch, first means for detecting a manual operation of said additional manual switch and for rewinding the tape from a first position while said additional manual switch is being operated, second means for detecting a release of operation of said additional manual switch to operate said VCR in a playback mode, and third means for detecting a second manual operation of said additional manual switch to set the tape to said first position and to continue playback thereafter.

* * * * *